US009296349B2

(12) United States Patent
Nakamura et al.

(10) Patent No.: US 9,296,349 B2
(45) Date of Patent: Mar. 29, 2016

(54) VEHICLE AND EXTERNAL POWER FEEDING APPARATUS

(75) Inventors: Toru Nakamura, Toyota (JP); Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 13/979,259

(22) PCT Filed: Feb. 4, 2011

(86) PCT No.: PCT/JP2011/052368
§ 371 (c)(1),
(2), (4) Date: Jul. 11, 2013

(87) PCT Pub. No.: WO2012/105040
PCT Pub. Date: Aug. 9, 2012

(65) Prior Publication Data
US 2013/0300359 A1  Nov. 14, 2013

(51) Int. Cl.
*H02J 7/00* (2006.01)
*B60R 16/033* (2006.01)
*B60L 11/18* (2006.01)
(Continued)

(52) U.S. Cl.
CPC .............. *B60R 16/033* (2013.01); *B60L 11/14* (2013.01); *B60L 11/182* (2013.01); *B60L 11/1833* (2013.01); *B60M 7/003* (2013.01); *H02J 5/005* (2013.01); *H02J 7/025* (2013.01); *B60K 1/04* (2013.01); *B60L 2210/10* (2013.01); *B60L 2210/30* (2013.01); *B60L 2210/40* (2013.01); *Y02T 10/70* (2013.01); *Y02T 10/7005* (2013.01); *Y02T 10/7077* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
CPC ................... A61B 17/00491; A61F 2210/009; B60L 11/007; B60L 11/1801; B60L 11/1824; B60L 11/1877; H02J 2007/0062; H02J 7/0042; H02J 7/0045; Y02T 10/7005; Y02T 10/705; Y02T 10/7088; Y02T 90/121
USPC .................................................. 320/107–115
See application file for complete search history.

(56) References Cited

U.S. PATENT DOCUMENTS 7,741,734 B2   6/2010  Joannopoulos et al.
2001/0002789 A1*  6/2001  Terazoe ........................ 320/108
(Continued)

FOREIGN PATENT DOCUMENTS

AU    2006269374 B2    1/2007
AU    2006269374 C1    1/2007
(Continued)

Primary Examiner — Binh Tat
(74) Attorney, Agent, or Firm — Oliff PLC

(57) ABSTRACT

An electrical powered vehicle is equipped with a coil unit capable of receiving electric power from a facility self-resonant coil external to the vehicle. The electrical powered vehicle includes: a pair of side members aligned in a widthwise direction of the vehicle and extending in a fore-aft direction of the vehicle; a vehicle self-resonant coil coupled with the facility self-resonant coil resonantly via an electromagnetic field to be capable of at least one of transmitting electric power and receiving electric power; and a vehicle capacitor provided to the vehicle self-resonant coil between the paired side members.

16 Claims, 10 Drawing Sheets

(51) Int. Cl.
  *B60M 7/00* (2006.01)
  *H02J 7/02* (2006.01)
  *B60L 11/14* (2006.01)
  *H02J 5/00* (2006.01)
  *B60K 1/04* (2006.01)

(56) References Cited

U.S. PATENT DOCUMENTS

| | | |
|---|---|---|
| 2007/0222542 A1 | 9/2007 | Joannopoulos et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0225271 A1* | 9/2010 | Oyobe et al. .................. 320/108 |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0244582 A1 | 9/2010 | Yoshikawa |
| 2010/0253152 A1 | 10/2010 | Karalis et al. |
| 2010/0264745 A1 | 10/2010 | Karalis et al. |
| 2011/0163714 A1* | 7/2011 | Ettes et al. .................... 320/108 |
| 2011/0309790 A1 | 12/2011 | Sasaki |
| 2012/0018238 A1 | 1/2012 | Mizoguchi et al. |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-2000-351328 | 12/2000 |
| JP | A-2003-143711 | 5/2003 |
| JP | A-2009-501510 | 1/2009 |
| JP | A-2009-106136 | 5/2009 |
| JP | A-2010-87353 | 4/2010 |
| JP | A-2010-239848 | 10/2010 |
| JP | A-2010-268660 | 11/2010 |
| JP | 2011-006052 A | 1/2011 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | WO 2010/058477 A1 | 5/2010 |

\* cited by examiner

DISTANCE FROM CURRENT SOURCE
(MAGNETIC CURRENT SOURCE)

VEHICLE AND EXTERNAL POWER FEEDING APPARATUS

TECHNICAL FIELD

The present invention relates to a vehicle and an external power feeding apparatus.

BACKGROUND ART

In recent years, a charging device for charging a battery or the like that is mounted in a vehicle contactlessly from power supply facilities external to the vehicle, and a vehicle equipped with that charging device are attracting an attention.

For example, Japanese Patent Laying-Open No. 2009-106136 discloses an electrical powered vehicle including a secondary self-resonant coil, a capacitor connected to the secondary self-resonant coil, a secondary coil coupled with the secondary self-resonant coil through electromagnetic induction, and a power storage device.

Japanese Patent Laying-Open No. 2009-106136 discloses power supply facilities including a high-frequency power driver connected to an AC power supply, a primary coil connected to the high-frequency power driver, a primary self-resonant coil, and a capacitor connected to the primary self-resonant coil.

The primary self-resonant coil and the secondary self-resonant coil resonate via an electromagnetic field to transmit electric power from the primary self-resonant coil to the secondary self-resonant coil.

Japanese Patent Laying-Open No. 2010-087353 discloses a vehicle including a contactless power transfer device that for example receives electric power from external facilities. This contactless power transfer device includes a secondary self-resonant coil that for example receives electric power via an electromagnetic field from an opposite, primary self-resonant coil, and a bobbin having an inner circumferential surface along which the secondary self-resonant coil is held.

Note that coupling the primary self-resonant coil and the secondary self-resonant coil resonantly via an electromagnetic field to provide contactless power transfer as described above is a technique attracting attention in recent years.

Other than such a power feeding apparatus utilizing resonant coupling via an electromagnetic field, a power feeding apparatus described in Japanese Patent Laying-Open No. 2003-143711 or the like is also known.

CITATION LIST

Patent Documents

PTD 1: Japanese Patent Laying-Open No. 2009-106136
PTD 2: Japanese Patent Laying-Open No. 2010-087353
PTD 3: Japanese Patent Laying-Open No. 2003-143711

SUMMARY OF THE INVENTION

Technical Problem

The vehicle and power supply facilities described in Japanese Patent Laying-Open Nos. 2009-106136 and 2010-087353, however, have a possibility of leaking an intense magnetic field around the vehicle while it has a battery charged.

Note that the power feeding apparatus described in Japanese Patent Laying-Open No. 2003-143711 also has a possibility of leaking an intense magnetic field while a battery is charged.

The present invention has been made in view of the above issue, and an object of the present invention is to exploit resonant coupling via an electromagnetic field to prevent a vehicle that can receive electric power from facilities external to the vehicle from having an intense magnetic field leaking around the vehicle while the vehicle is receiving electric power.

A second object of the present invention is to provide an external power feeding apparatus provided for a vehicle and resonantly coupled via an electromagnetic field with a self-resonant coil of the vehicle to transmit electric power without an intense magnetic field leaking around the vehicle.

Solution to Problem

The present vehicle is equipped with a coil unit capable of receiving electric power from a facility self-resonant coil external to the vehicle. The vehicle includes: a pair of side members aligned in a widthwise direction of the vehicle and extending in a fore-aft direction of the vehicle; a vehicle self-resonant coil coupled with the facility self-resonant coil resonantly via an electromagnetic field to be capable of receiving electric power from the facility self-resonant coil; and a vehicle capacitor provided to the vehicle self-resonant coil between the pair of side members.

Preferably, the vehicle capacitor is provided between a lateral side of the vehicle and a virtual line extending in the fore-aft direction of the vehicle through a widthwise center of the vehicle and the vehicle capacitor is disposed at a position closer to the virtual line than the lateral side of the vehicle.

Preferably, the vehicle further includes: a floor panel provided on the side members; a center tunnel that is formed at the floor panel to extend in the fore-aft direction of the vehicle through a widthwise center of the vehicle and is also formed to be raised upwards; and a shield material provided at an internal surface of the center tunnel and a lower surface of the floor panel.

The vehicle capacitor is disposed under the floor panel in the center tunnel or around an opening of the center tunnel.

Preferably, the vehicle further includes a floor panel provided on the side members. The vehicle self-resonant coil is disposed under the floor panel and spaced from the floor panel.

Preferably, the vehicle further includes: a center tunnel that is formed at the floor panel to be located at a widthwise center of the vehicle and extend in the fore-aft direction of the vehicle, and also be raised upwards; and an exhaust pipe extending in the fore-aft direction of the vehicle and having at least a portion entering the center tunnel. The vehicle self-resonant coil includes a first arcuate portion aligned with the exhaust pipe in a horizontal direction, a second arcuate portion aligned with the exhaust pipe in the horizontal direction opposite to the first arcuate portion with the exhaust pipe posed therebetween, and a connection portion passing upwardly of the exhaust pipe and connecting the first arcuate portion and the second arcuate portion together. A distance between the connection portion and the exhaust pipe in a vertical direction is larger than a distance between the connection portion and the center tunnel in the vertical direction.

Preferably, the vehicle further includes: a center tunnel that is formed at the floor panel to be located at a widthwise center of the vehicle and extend in the fore-aft direction of the vehicle, and also be raised upwards; and an exhaust pipe extending in the fore-aft direction of the vehicle and having at least a portion entering the center tunnel. The vehicle self-resonant coil includes a first arcuate portion aligned with the exhaust pipe in a horizontal direction, a second arcuate portion aligned with the exhaust pipe in the horizontal direction opposite to the first arcuate portion with the exhaust pipe posed therebetween, and a connection portion passing downwardly of the exhaust pipe and connecting the first arcuate portion and the second arcuate portion together. A distance between the connection portion and the exhaust pipe in a vertical direction is larger than a distance between the exhaust pipe and the center tunnel in the vertical direction.

Preferably, the vehicle further includes: a battery; and an electromagnetic induction coil electrically connected to the battery and capable of receiving electric power from the vehicle self-resonant coil through electromagnetic induction. The electromagnetic induction coil and the vehicle self-resonant coil are aligned in a horizontal direction.

Preferably, the vehicle further includes: a floor panel provided on the side members; and an exhaust pipe disposed downwardly of the floor panel and extending in the fore-aft direction of the vehicle. The vehicle self-resonant coil includes a first arcuate portion aligned with the exhaust pipe in the horizontal direction, a second arcuate portion aligned with the exhaust pipe in the horizontal direction opposite to the first arcuate portion with the exhaust pipe posed therebetween, and a first connection portion passing upwardly of the exhaust pipe and connecting the first arcuate portion and the second arcuate portion together. The electromagnetic induction coil includes a third arcuate portion aligned with the exhaust pipe in the horizontal direction, a fourth arcuate portion aligned with the exhaust pipe in the horizontal direction opposite to the third arcuate portion with the exhaust pipe posed therebetween, and a second connection portion passing upwardly of the exhaust pipe and connecting the third arcuate portion and the fourth arcuate portion together.

Preferably, the vehicle further includes: a floor panel provided on the side members; and an exhaust pipe disposed downwardly of the floor panel and extending in the fore-aft direction of the vehicle. The vehicle self-resonant coil includes a first arcuate portion aligned with the exhaust pipe in the horizontal direction, a second arcuate portion aligned with the exhaust pipe in the horizontal direction opposite to the first arcuate portion with the exhaust pipe posed therebetween, and a first connection portion passing downwardly of the exhaust pipe and connecting the first arcuate portion and the second arcuate portion together. The electromagnetic induction coil includes a third arcuate portion aligned with the exhaust pipe in the horizontal direction, a fourth arcuate portion aligned with the exhaust pipe in the horizontal direction opposite to the third arcuate portion with the exhaust pipe posed therebetween, and a second connection portion passing downwardly of the exhaust pipe and connecting the third arcuate portion and the fourth arcuate portion together. Preferably the vehicle further includes: a floor panel provided on the side members; an exhaust pipe disposed downwardly of the floor panel and extending in the fore-aft direction of the vehicle; a first securing member that secures the vehicle capacitor to the floor panel; and a second securing member that is provided separately from the first securing member and secures the exhaust pipe to the floor panel.

Preferably, the vehicle further includes: a floor panel provided on the side members; and an exhaust pipe disposed downwardly of the floor panel and extending in the fore-aft direction of the vehicle. The exhaust pipe includes a pipe body and a pipe shield material covering a portion of the pipe body located under the coil unit.

Preferably, the vehicle further includes: a floor panel provided on the side members; and a shield material provided between the vehicle self-resonant coil and the floor panel.

The present external power feeding apparatus is provided in a space allowing a vehicle to be stopped therein, the vehicle including a pair of spaced side members, a floor panel provided on the pair of side members, a vehicle self-resonant coil, and a vehicle capacitor disposed under the floor panel between the side members and connected to the vehicle self-resonant coil. Preferably, the external power feeding apparatus includes: a facility self-resonant coil coupled with the vehicle self-resonant coil resonantly via an electromagnetic field to be capable of transmitting electric power to the vehicle self-resonant coil; and a facility capacitor connected to the facility self-resonant coil. The facility capacitor is positioned below and between the side members when the vehicle is stopped in the space.

Preferably, the vehicle self-resonant coil includes a first arcuate portion aligned in a horizontal direction with an exhaust pipe located under the floor panel, a second arcuate portion aligned with the exhaust pipe in the horizontal direction opposite to the first arcuate portion with the exhaust pipe posed therebetween, and a connection portion crossing over the exhaust pipe and connecting the first arcuate portion and the second arcuate portion together. The facility self-resonant coil is a planar coil.

Preferably, the vehicle self-resonant coil and the facility self-resonant coil substantially match in diameter and the facility capacitor is larger in capacitance than the vehicle capacitor.

Advantageous Effect of Invention

The present vehicle can thus contactlessly receive electric power external to the vehicle without an intense magnetic field leaking around the vehicle. The present external power feeding apparatus can thus contactlessly transmit electric power to a vehicle without an intense magnetic field leaking around the vehicle.

BRIEF DESCRIPTION OF THE DRAWINGS

FIG. 7 is a perspective view of a floor panel 11, a center tunnel 12, an exhaust pipe 20, and the like.

FIG. 8 is a perspective view of a vehicle coil unit 101 shown in FIG. 5, FIG. 6, and the like.

DESCRIPTION OF EMBODIMENTS

When referring to the number, amount, and the like in the embodiments set forth below, the scope of the present invention is not necessarily limited to the cited number, amount, and the like, unless particularly noted otherwise. Furthermore, each of the constituent elements set forth in the embodiments is not necessarily mandatory, unless particularly noted otherwise.

First Embodiment

A vehicle and an external power feeding apparatus according to a first embodiment of the present invention will be described based on FIGS. 1-13.

Figure 1:
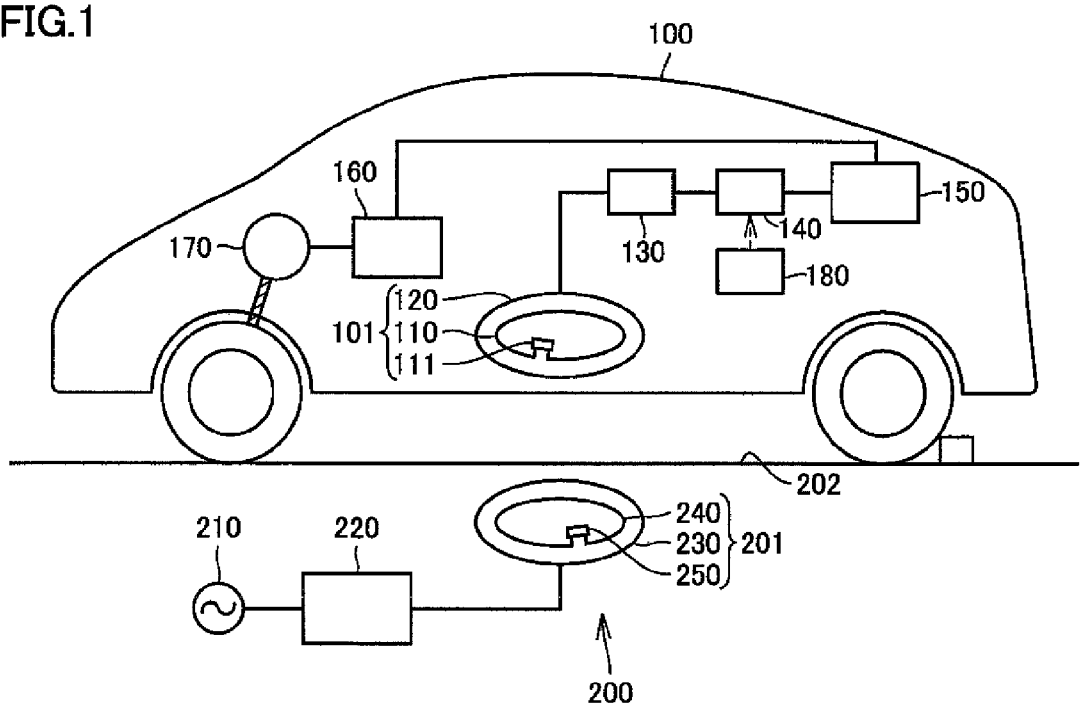
FIG. 1 schematically represents an electrical powered vehicle 100 and an external power feeding apparatus 200 feeding electric power to electrical powered vehicle 100 according to a first embodiment.

FIG. 1 schematically represents an electrical powered vehicle 100, and an external power feeding apparatus 200 feeding electric power to electrical powered vehicle 100 according to the first embodiment.

Electrical powered vehicle 100 parks at a predetermined position in a parking space 202 where external power feeding apparatus 200 is provided to receive electric power mainly from external power feeding apparatus 200. Electrical powered vehicle 100 can supply electric power to external power feeding apparatus 200.

At parking space 202, a wheel block and lines are provided for electrical powered vehicle 100 to park at the predetermined position.

External power feeding apparatus 200 includes a high frequency power driver 220 connected to an AC source 210, and a facility coil unit 201 connected to high frequency power driver 220. Facility coil unit 201 functions mainly as a non-contact power transmission device, and includes a facility self-resonant coil 240, a facility capacitor 250 connected to facility self-resonant coil 240 and a facility electromagnetic induction coil 230 electrically connected to facility self-resonant coil 240.

AC source 210 is a source external to the vehicle such as a system power supply. High frequency power driver 220 converts the electric power received from AC source 210 into electric power of high frequency, and supplies the converted high frequency power to facility electromagnetic induction coil 230. The frequency of the high frequency power generated by high frequency power driver 220 is, for example, 1 MHz to several tens MHz.

Facility electromagnetic induction coil 230 has the aforementioned high frequency power supplied such that the amount of magnetic flux generated from facility electromagnetic induction coil 230 varies over time.

Facility self-resonant coil 240 is coupled in an electromagnetic-induction manner with facility electromagnetic induction coil 230. The change in the amount of magnetic flux from facility electromagnetic induction coil 230 causes a current of high frequency to flow through facility self-resonant coil 240 by electromagnetic induction.

Current is supplied to facility electromagnetic induction coil 230 such that the frequency of the high frequency current flowing through facility self-resonant coil 240 substantially matches the resonant frequency determined by the reluctance of facility electromagnetic induction coil 230 and the capacitance C of facility capacitor 250 connected to facility electromagnetic induction coil 230. Facility self-resonant coil 240 and facility capacitor 250 function as an LC resonator.

Around facility self-resonant coil 240, an electric field and magnetic field of a frequency substantially equal to the relevant resonant frequency are developed. Thus, an electromagnetic field of a predetermined frequency is developed around facility self-resonant coil 240.

Electrical powered vehicle 100 includes an LC resonator having a resonant frequency identical to that of the LC resonator formed by facility self-resonant coil 240 and facility capacitor 250. By the relevant LC resonator and the LC resonator formed by facility self-resonant coil 240 and facility capacitor 250 establishing electromagnetic field resonant coupling, electric power is transmitted from external power feeding apparatus 200 to electrical powered vehicle 100.

Electrical powered vehicle 100 and external power feeding apparatus 200 take advantage of mainly the near field (evanescent field) among the electromagnetic field developed by facility self-resonant coil 240 and facility capacitor 250 to cause supply of electric power from the side of external power feeding apparatus 200 towards electrical powered vehicle 100. Details of the wireless power transmission/reception method utilizing the electromagnetic resonance method will be described afterwards.

Electrical powered vehicle 100 includes a vehicle coil unit 101 mainly functioning as a non-contact power reception device, a rectifier 130 connected to vehicle coil unit 101, a DC/DC converter 140 connected to rectifier 130, a battery 150 connected to DC/DC converter 140, a power control unit (PCU) 160, a motor unit 170 connected to power control unit 160, and a vehicle electronic control unit (vehicle ECU) 180 controlling the driving of DC/DC converter 140, power control unit 160, and the like.

Although electrical powered vehicle 100 of the present embodiment is a hybrid vehicle with an engine not shown, any vehicle driven by a motor such as an electric vehicle and fuel cell vehicle is intended to be included.

Vehicle coil unit 101 includes a vehicle self-resonant coil 110, a vehicle capacitor 111 connected to vehicle self-resonant coil 110, and a vehicle electromagnetic induction coil 120 coupled with vehicle self-resonant coil 110 by electromagnetic induction. Details of the configuration of vehicle coil unit 101 will be described afterwards.

Vehicle self-resonant coil 110 and vehicle capacitor 111 constitute an LC resonator. The resonant frequency of the LC resonator formed by vehicle self-resonant coil 110 and vehicle capacitor 111 substantially matches the resonant frequency of the LC resonator formed by facility self-resonant coil 240 and facility capacitor 250.

When a high frequency current having a frequency identical to the resonant frequency of the relevant LC resonator is supplied to facility self-resonant coil 240, an electromagnetic field having a frequency equal to the relevant resonant frequency is developed.

When vehicle self-resonant coil 110 is arranged within a range of approximately several meters, for example, from facility self-resonant coil 240, the LC resonator formed by vehicle self-resonant coil 110 and vehicle capacitor 111 resonates to cause a current to flow through vehicle self-resonant coil 110. Thus, vehicle self-resonant coil 110 and facility self-resonant coil 240 establish electromagnetic field resonant coupling.

Vehicle electromagnetic induction coil 120 establishes electromagnetic induction coupling with vehicle self-resonant coil 110 to draw out the electric power received at vehicle self-resonant coil 110. The sequential output of electric power from vehicle self-resonant coil 110 by vehicle electromagnetic induction coil 120 causes electric power to be supplied sequentially from facility self-resonant coil 240 to vehicle self-resonant coil 110 through the electromagnetic field. As such, vehicle coil unit 101 and facility coil unit 201 employ the wireless power transmission/reception method of the so-called electromagnetic resonance scheme.

Rectifier 130 is connected to vehicle electromagnetic induction coil 120 to convert AC current supplied from vehicle electromagnetic induction coil 120 into DC current for supply to DC/DC converter 140.

DC/DC converter 140 adjusts the voltage of the DC current from rectifier 130 and supplies the adjusted DC current to battery 150.

Power control unit 160 includes a converter connected to battery 150, and an inverter connected to this converter. The converter adjusts (boosts) the DC current from battery 150 for supply to the inverter. The inverter converts the DC current from the converter into AC current for supply to motor unit 170.

Motor unit 170 includes, for example, a 3-phase AC motor or the like, and is driven by the AC current supplied from the inverter of power control unit 160.

In the supplying step of the electric power stored in battery 150 to AC source 210, DC/DC converter 140 boosts the current from battery 150, for example, to supply the boosted current to rectifier 130. Rectifier 130 converts the DC current from DC/DC converter 140 into high frequency current. The frequency of the high frequency current is equal to the aforementioned resonant frequency.

Rectifier 130 supplies the high frequency current to vehicle electromagnetic induction coil 120. Vehicle self-resonant coil 110 receives the high frequency current from vehicle electromagnetic induction coil 120 by electromagnetic induction. The frequency of this high frequency current substantially matches the resonant frequency. The LC resonator formed by vehicle self-resonant coil 110 and vehicle capacitor 111 resonates. Then, an electromagnetic field having a frequency equal to the aforementioned resonant frequency is developed around vehicle self-resonant coil 110.

By arranging facility self-resonant coil 240 within the range of approximately several meters, for example, from vehicle self-resonant coil 110, the LC resonator formed by facility self-resonant coil 240 and facility capacitor 250 resonates. The electric power supplied to facility self-resonant coil 240 is drawn out to facility electromagnetic induction coil 230 through electromagnetic induction. The electric power drawn out to facility self-resonant coil 240 passes through high frequency power driver 220 to be supplied to AC source 210.

In the case where electrical powered vehicle 100 is a hybrid vehicle, electrical powered vehicle 100 further includes an engine and a power split mechanism. Motor unit 170 includes a motor generator functioning mainly as a power generator, and a motor generator functioning mainly as an electric motor.

A wireless power transmission/reception scheme based on a resonance method taking advantage of an electromagnetic field is employed between vehicle coil unit 101 and facility coil unit 201 according to the first embodiment.

Figure 2:
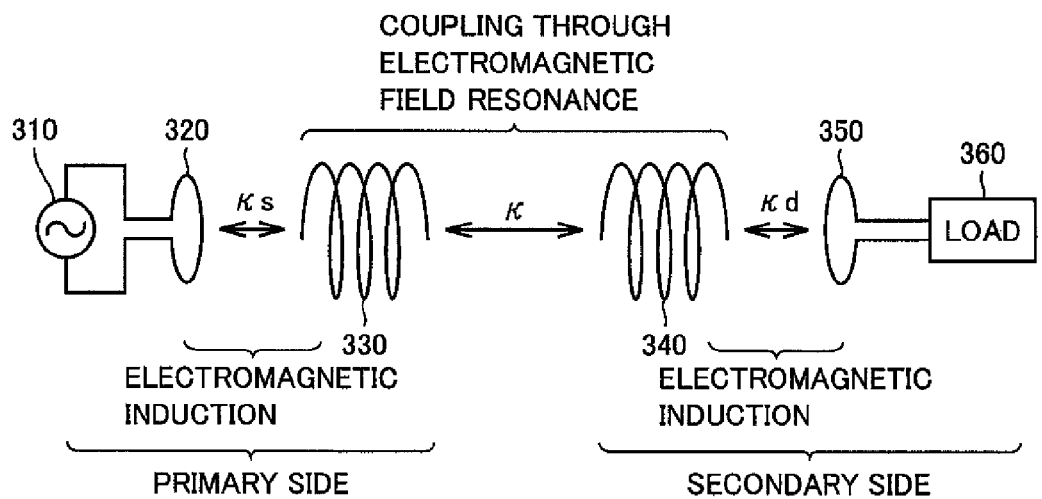
FIG. 2 is a schematic diagram for illustrating a mechanism of power transmission and power reception through resonance.

FIG. 2 is a schematic diagram to describe the mechanism of power transmission and reception by the resonant method. The mechanism of power transmission and power reception by the resonant method will be described based on FIG. 2.

Referring to FIG. 2, the resonance method is similar to the resonance of two tuning forks. By the resonance of two LC resonant coils having the same natural frequency at the electromagnetic field (near field), electric power is transferred from one coil to the other coil via the electromagnetic field.

Specifically, a primary coil 320 is connected to high frequency power source 310, and electric power of a frequency as high as 1 MHz to several tens MHz is supplied to primary self-resonant coil 330 that is magnetically coupled with primary coil 320 by electromagnetic induction. Primary self-resonant coil 330 is an LC resonator based on the coil's inductance and floating capacitance (when a capacitor is connected to the coil, including the capacitance of the capacitor), resonating with a secondary self-resonant coil 340 having the same resonant frequency as primary self-resonant coil 330 via an electromagnetic field (near field). Accordingly, energy (electric power) is transferred from primary self-resonant coil 330 to secondary self-resonant coil 340 via the electromagnetic field. The energy (electric power) transferred to secondary self-resonant coil 340 is extracted by secondary coil 350 magnetically coupled with secondary self-resonant coil 340 through electromagnetic induction to be provided to a load 360. Power transmission by the resonance method is realized when the Q value representing the resonance strength between primary self-resonant coil 330 and secondary self-resonant coil 340 is higher than 100, for example.

As to the corresponding relationship between the configuration of FIG. 2 and the configuration of FIG. 1, AC source 210 and high frequency power driver 220 shown in FIG. 1 correspond to high frequency power source 310 of FIG. 2. Facility electromagnetic induction coil 230 of FIG. 1 corresponds to primary coil 320 of FIG. 2. Further, facility self-resonant coil 240 and facility capacitor 250 of FIG. 1 correspond to primary self-resonant coil 330 of FIG. 2 and the floating capacitance of primary self-resonant coil 330.

Vehicle self-resonant coil 110 and vehicle capacitor 111 of FIG. 1 correspond to secondary self-resonant coil 340 of FIG. 2 and the floating capacitance of secondary self-resonant coil 340.

Vehicle electromagnetic induction coil 120 of FIG. 1 corresponds to secondary coil 350 of FIG. 2. Rectifier 130, DC/DC converter 140 and battery 150 of FIG. 1 correspond to load 360 of FIG. 2.

The wireless power transmission/reception scheme according to the first embodiment aims to improve the power transmission and reception efficiency by utilizing the near field (evanescent field) where "electrostatic field" of the electromagnetic field is dominant.

Figure 3:
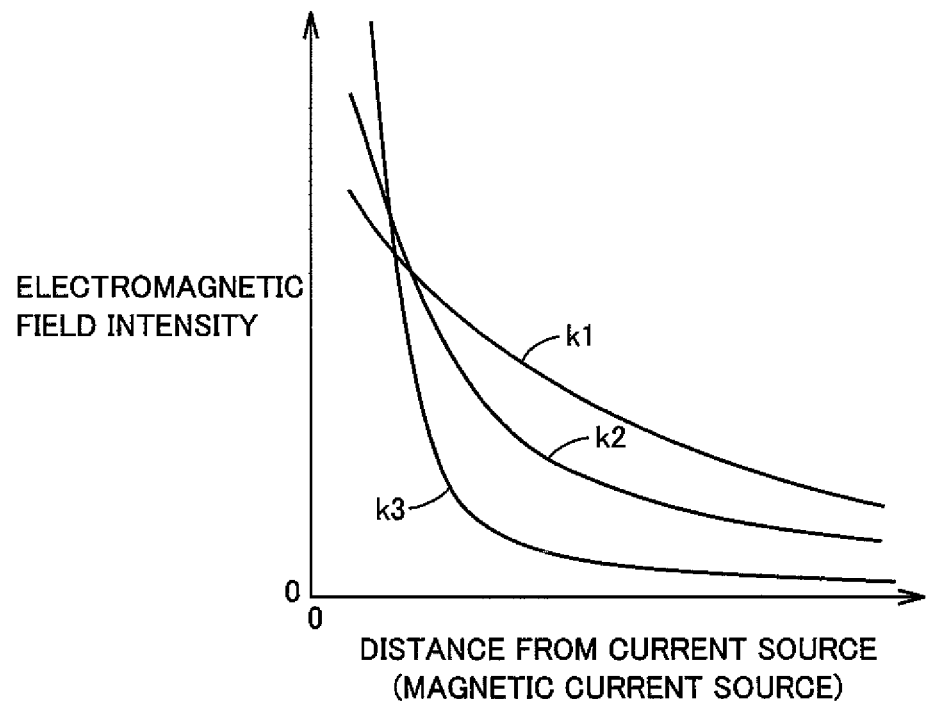
FIG. 3 represents a relationship between a distance from a current source (a magnetic current source) and electromagnetic field intensity.

FIG. 3 represents the relationship between the distance from the current source (magnetic current source) and the electromagnetic field intensity. Referring to FIG. 3, the electromagnetic field is composed of three components. Curve k1 represents a component inversely proportional to the distance from the wave source, and is referred to as "radiation electric field". Curve k2 represents a component inversely proportional to the square of the distance from the wave source, and is referred to as "induction electric field". Curve k3 represents a component inversely proportional to the cube of the distance from the wave source, and is referred to as "electrostatic field".

"Electrostatic field" is a region where the intensity of the electromagnetic wave decreases drastically according to the distance from the wave source. In the resonance method, energy (electric power) is transmitted taking advantage of the near field (evanescent field) where this "electrostatic field" is dominant. Specifically, a pair of resonators (for example, a pair of LC resonant coils) having the same natural frequency is caused to resonate in the near field where "electrostatic field" is dominant, whereby energy (electric, power) is transferred from one resonator (primary self-resonant coil) to the other resonator (secondary self-resonant coil). Since the "electrostatic field" does not pass on energy far away, the resonance method allows power to be transmitted with lower energy loss as compared to an electromagnetic wave that transmits energy (electric power) by the "radiation electric field" that passes on energy over a great distance.

Thus, electrical powered vehicle 100 and external power feeding apparatus 200 of the first embodiment take advantage of the resonance at the near field of the electromagnetic field to carry out transmission and reception of electric power between vehicle coil unit 101 of electrical powered vehicle 100 and facility coil unit 201 of external power feeding apparatus 200.

Leakage of an intense magnetic field around the vehicle during transmission and reception of electric power between vehicle coil unit 101 and facility coil unit 201 may adversely affect electrical devices around electrical powered vehicle 100.

As a result of diligent study, the inventors of the present invention found out that a magnetic field of particularly high intensity is developed from vehicle capacitor 111 and facility capacitor 250 that configure a portion of a resonator during power reception and transmission. The present invention is directed to suppressing leakage of a magnetic field of high intensity around electrical powered vehicle 100 during the process of power reception and power transmission. A specific configuration therefor will be described hereinafter.

Figure 4:
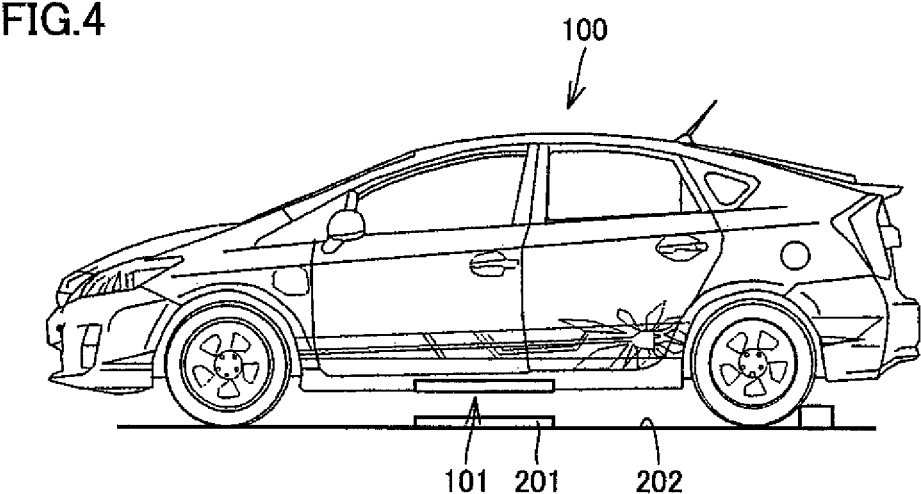
FIG. 4 is a side view of electrical powered vehicle 100, a facility coil unit 201 and the like according to the first embodiment.

FIG. 4 is a side view of electrical powered vehicle 100, facility coil unit 201 and the like according to the first embodiment. Note that, in FIG. 4, electrical powered vehicle 100 is parked in a parking space 202 at a prescribed position.

As shown in FIG. 4, vehicle coil unit 101 is provided to electrical powered vehicle 100 on a bottom surface at a center as seen in a longitudinal direction of electrical powered vehicle 100. Specifically, vehicle coil unit 101 is provided at a position closer to the center in the longitudinal direction of electrical powered vehicle 100 than the front and rear ends of electrical powered vehicle 100.

Facility coil unit 201 is provided in parking space 202 to face vehicle coil unit 101 when electrical powered vehicle 100 is parked in parking space 202 at the prescribed position. Note that facility coil unit 201 may be provided on the ground in parking space 202 or may be provided in parking space 202 in a hole formed in the ground.

Figure 5:
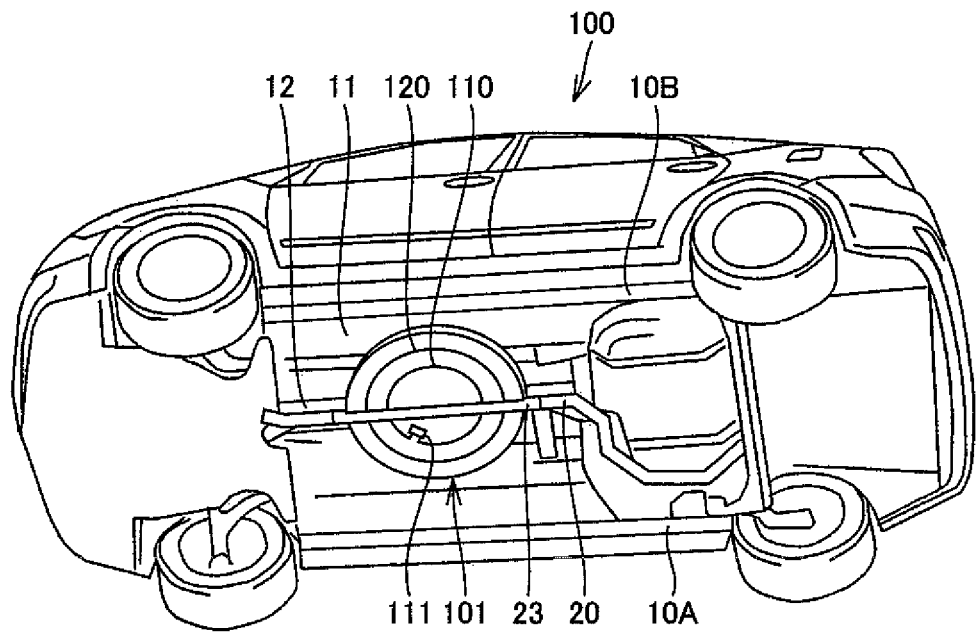
FIG. 5 is a perspective view of electrical powered vehicle 100 as seen at a bottom side thereof.
Figure 6:
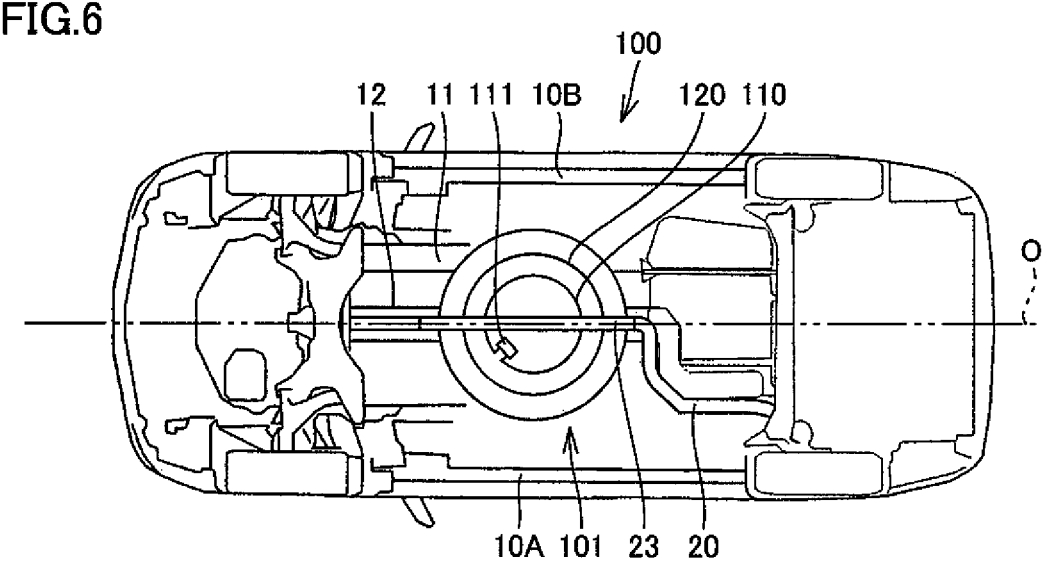
FIG. 6 is a bottom view of electrical powered vehicle 100.

FIG. 5 is a perspective view of electrical powered vehicle 100 as seen at a bottom side and FIG. 6 is a bottom view of electrical powered vehicle 100.

As shown in FIG. 5 and FIG. 6, electrical powered vehicle 100 includes a pair of side members 10A and 10B provided at a bottom surface of electrical powered vehicle 100 and spaced in a widthwise direction of electrical powered vehicle 100, a floor panel 11 disposed on side members 10A and 10B, and an exhaust pipe 20 disposed at a lower surface of floor panel 11, and vehicle coil unit 101 is disposed on a lower surface of floor panel 11 between side members 10A and 10B.

Side members 10A and 10B configure a portion of a frame of the vehicle and are each disposed on the bottom surface of electrical powered vehicle 100 near a lateral side portion thereof. Side members 10A and 10B extend in a fore-aft direction of the vehicle.

Floor panel 11 is a partitioning wall that partitions an interior of the vehicle and an exterior of the vehicle, and floor panel 11 is secured on side members 10A and 10B.

Floor panel 11 at a widthwise center of electrical powered vehicle 100 has a center tunnel 12 extending in the fore-aft direction of electrical powered vehicle 100.

Exhaust pipe 20 is disposed under center tunnel 12 such that exhaust pipe 20 has an upper end partially entering center tunnel 12. Exhaust pipe 20 extends in the fore-aft direction of electrical powered vehicle 100, and has one end connected to the engine of electrical powered vehicle 100 and the other end connected to a muffler.

The engine is disposed in an engine compartment formed at a front side of the vehicle, and the muffler is connected to a rear end of the vehicle.

Vehicle coil unit 101 is disposed between exhaust pipe 20 and floor panel 11.

Figure 7:
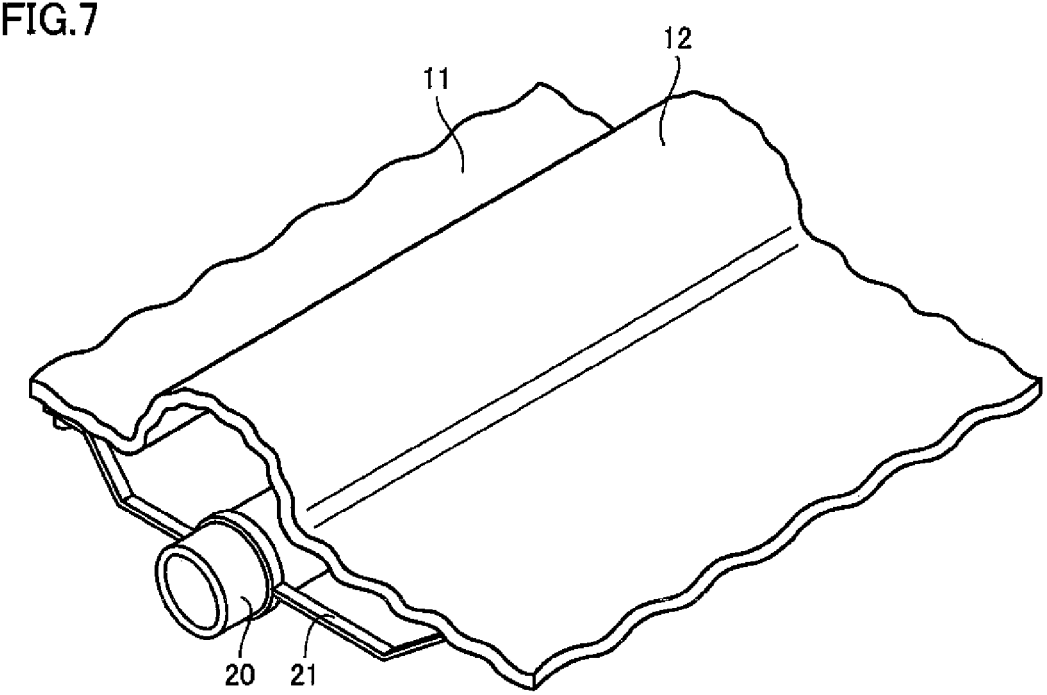

FIG. 7 is a perspective view of floor panel 11, center tunnel 12, exhaust pipe 20, and the like. As shown in FIG. 7, center tunnel 12 is formed to be raised upwards. Exhaust pipe 20 is disposed under center tunnel 12 and spaced therefrom, and secured to floor panel 11 by a support 21.

Figure 8:
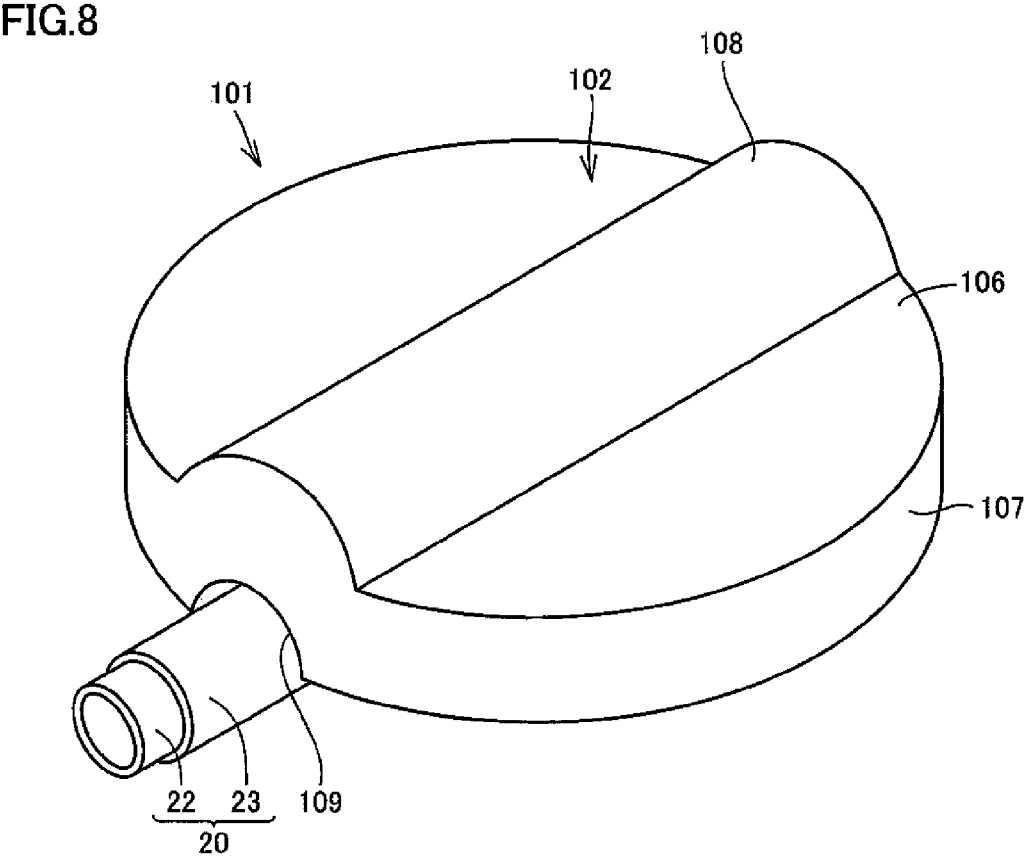
Figure 9:
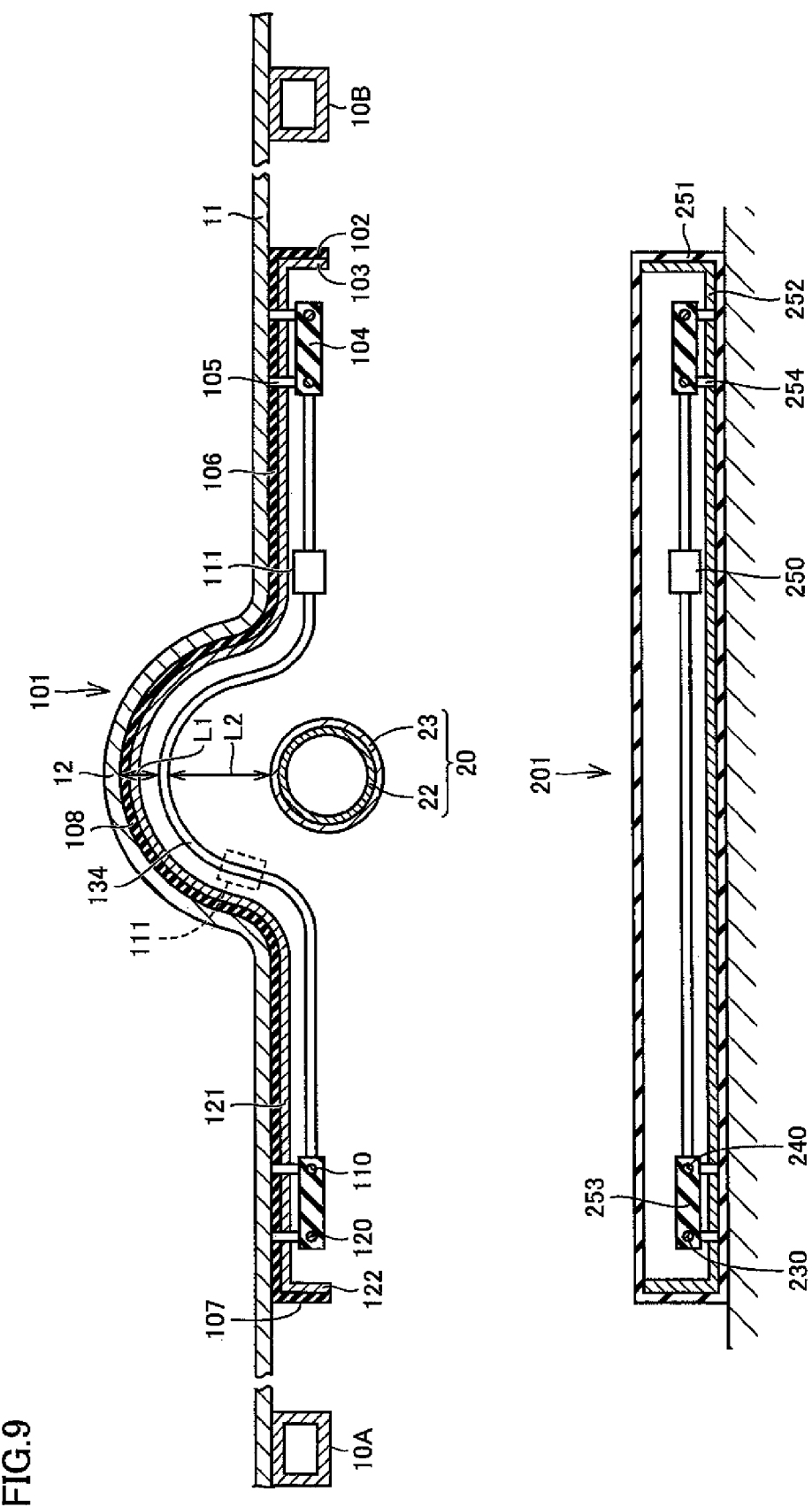
FIG. 9 is a cross section of vehicle coil unit 101 and facility coil unit 201.

FIG. 8 is a perspective view of vehicle coil unit 101 shown in FIG. 5, FIG. 6, and the like, and FIG. 9 is a cross section of vehicle coil unit 101 and facility coil unit 201.

In FIG. 8, exhaust pipe 20 includes a body 22 of the pipe and a shield material 23 provided on a circumferential surface of body 22 of the pipe. Body 22 of the pipe is formed of iron or similar metal material. Shield material 23 is formed of a metal material with a smaller eddy current loss, a smaller hysteresis loss and the like than a metal material that configures body 22 of the pipe, and shield material 23 is formed for example of copper, aluminum or similar metal material. Shield material 23 is provided on exhaust pipe 20 at a portion located under vehicle coil unit 101 and a portion adjacent thereto, as shown in FIG. 5 and FIG. 6.

As shown in FIG. 8 and FIG. 9, vehicle coil unit 101 is disposed under floor panel 11 between side members 10A and 10B. Furthermore, vehicle coil unit 101 is disposed between floor panel 11 and exhaust pipe 20.

Vehicle coil unit 101 includes a resin casing 102, a shield material 103 stuck on an internal surface of resin casing 102, vehicle self-resonant coil 110 accommodated in shield material 103, vehicle capacitor 111, vehicle electromagnetic induction coil 120, a support member 104 supporting vehicle electromagnetic induction coil 120 and vehicle self-resonant coil 110, and a rod 105 coupling support member 104 and floor panel 11.

Resin casing 102 is an insulating resin member. Resin casing 102 includes upper wall portion 106 attached to a lower surface of floor panel 11, and a peripheral wall portion 107 hanging downward from a peripheral portion of upper wall portion 106. Upper wall portion 106 is provided at a center portion thereof with a raised portion 108 extending along an internal surface of center tunnel 12 and raised upwards.

As shown in FIG. 8, peripheral wall portion 107 has an opening with an edge provided with a groove 109 curved along an external circumferential surface of exhaust pipe 20. Exhaust pipe 20 is disposed under vehicle coil unit 101.

Shield material 103 is formed of metal material such as copper for reduced eddy current loss and reduced hysteresis loss.

Shield material 103 includes an upper wall portion 121 extending along upper wall portion 106 of resin casing 102, and a peripheral wall portion 122 hanging downward from the peripheral portion of upper wall portion 121. Upper wall portion 121 includes a raised portion 123 extending along an internal surface of raised portion 108. Support member 104 is formed for example of an insulating resin material, and holds vehicle self-resonant coil 110 and vehicle electromagnetic induction coil 120 together. Support member 104 is secured to floor panel 11 by rod 105.

Vehicle capacitor 111 is disposed between side members 10A and 10B projecting from floor panel 11 downward, as is also apparent from FIG. 9.

Figure 10:
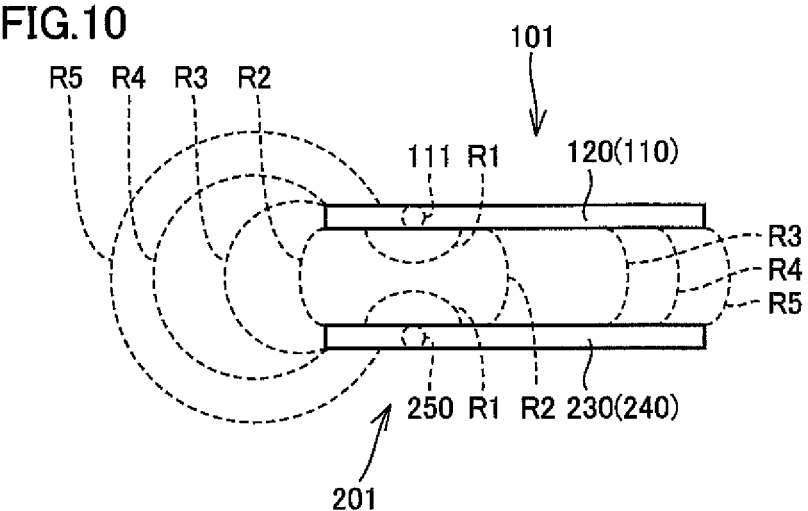
FIG. 10 schematically shows a magnetic field intensity distribution provided when vehicle coil unit 101 and facility coil unit 201 pass electric power therebetween.

FIG. 10 schematically shows a magnetic field intensity distribution provided when vehicle coil unit 101 and facility coil unit 201 pass electric power therebetween. In FIG. 10, an area R1 corresponds to a magnetic field highest in intensity and areas R2, R3, R4, R5 correspond to magnetic fields lower in intensity than areas R1, R2, R3, R4 respectively. It can be seen from FIG. 11 that the most intense magnetic field is developed around vehicle capacitor 111 and facility capacitor 250.

Herein, electrical powered vehicle 100 according to the first embodiment has vehicle capacitor 111 disposed between side members 10A and 10B, as shown in FIG. 9, and side members 10A and 10B minimize/prevent a magnetic field, an electromagnetic field or the like leaking around electrical powered vehicle 100.

In FIG. 5 and FIG. 6, vehicle capacitor 111 is provided between a centerline O extending in the fore-aft direction of electrical powered vehicle 100 through the widthwise center of electrical powered vehicle 100 and a lateral side of electrical powered vehicle 100, and vehicle capacitor 111 is disposed at a position closer to centerline O than the lateral side of electrical powered vehicle 100. This can minimize/prevent an intense magnetic field that is developed around vehicle capacitor 111 leaking around electrical powered vehicle 100.

In FIG. 9, vehicle capacitor 111 is disposed under floor panel 11 around the opening of center tunnel 12.

Of a magnetic field developed around center tunnel 12, a portion emitted upwardly of side member 10A is reflected towards facility coil unit 201 by shield material 103 provided on the internal surface of center tunnel 12 or is absorbed by shield material 103, or the like. This minimizes/prevents an intense magnetic field leaking around electrical powered vehicle 100.

Note that as indicated in FIG. 9 by a broken line, vehicle capacitor 111 may be disposed in center tunnel 12. Disposing vehicle capacitor 111 in center tunnel 12 also allows a magnetic field developed around vehicle capacitor 111 to have a portion that is emitted upwardly of side members 10A and 10B reflected towards facility coil unit 201 by shield material 103 provided at the internal surface of center tunnel 12, or absorbed by shield material 103, or the like. This minimizes/prevents an intense magnetic field leaking around electrical powered vehicle 100.

Note that in passing electric power, a magnetic field and an electromagnetic field are developed around vehicle self-resonant coil 110, vehicle capacitor 111, and vehicle electromagnetic induction coil 120, and, of the magnetic and electromagnetic fields, a portion emitted upwardly of vehicle self-resonant coil 110 is absorbed by shield material 103 or reflected towards facility coil unit 201. This minimizes/prevents magnetic and electromagnetic fields entering electrical powered vehicle 100.

Furthermore, of exhaust pipe 20, a portion located under vehicle coil unit 101 is provided with shield material 23, and vehicle coil unit 101 and facility coil unit 201 transmit electric power therebetween less inefficiently.

Figure 11:
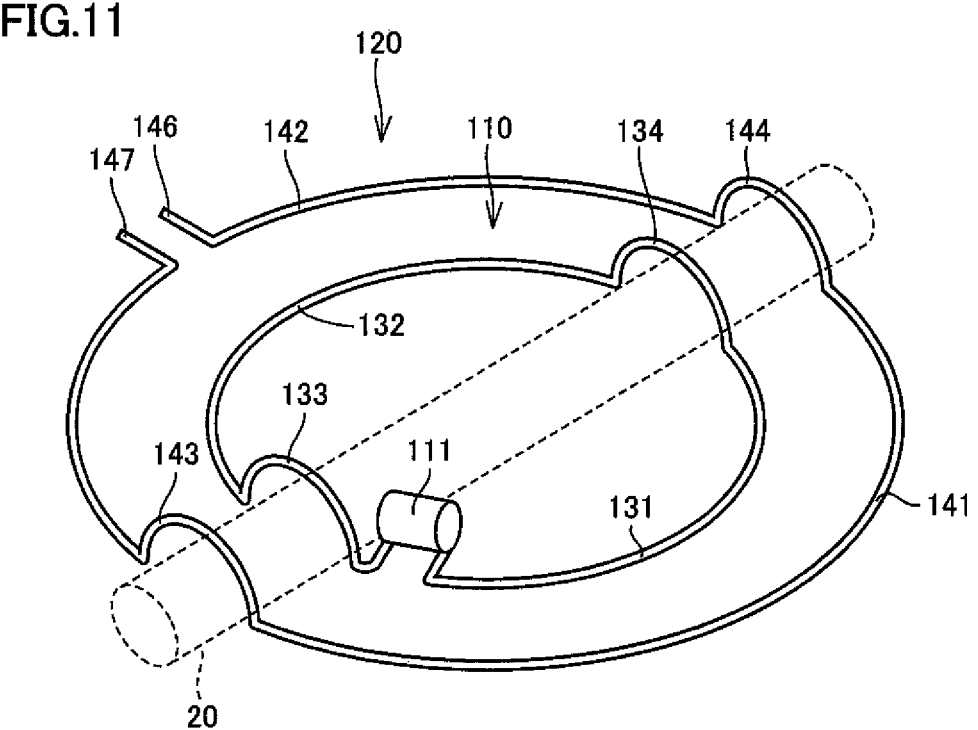
FIG. 11 is a perspective view of a vehicle self-resonant coil 110, a vehicle electromagnetic induction coil 120, and a vehicle capacitor 111.

FIG. 11 is a perspective view of vehicle self-resonant coil 110, vehicle electromagnetic induction coil 120, and vehicle capacitor 111.

Vehicle self-resonant coil 110 includes an arcuate portion 131 aligned with exhaust pipe 20 in a horizontal direction, an arcuate portion 132 opposite to arcuate portion 131 with exhaust pipe 20 posed therebetween, a connection portion 133 that connects one end of arcuate portion 131 and one end of arcuate portion 132 together, and a connection portion 134 that connects the other end of arcuate portion 131 and the other end of arcuate portion 132 together. Connection portion 133 and connection portion 134 pass between floor panel 11 and exhaust pipe 20 and are spaced from exhaust pipe 20 and floor panel 11.

With arcuate portion 132 and arcuate portion 132 aligned with exhaust pipe 20 in the horizontal direction and connection portions 133, 134 passing upwardly of exhaust pipe 20, vehicle self-resonant coil 110 less projects from the lower surface of floor panel 11. The FIG. 11 example shows vehicle capacitor 111 connected between an end of connection portion 133 and an end of arcuate portion 131.

Vehicle electromagnetic induction coil 120 is a planar coil and disposed radially outer than vehicle self-resonant coil 110. Vehicle electromagnetic induction coil 120 and vehicle self-resonant coil 110 are aligned substantially in a plane. This allows vehicle coil unit 101 to be reduced in thickness.

Vehicle electromagnetic induction coil 120 includes an arcuate portion 142 aligned with arcuate portion 132 and exhaust pipe 20 in a plane, an arcuate portion 141 aligned with arcuate portion 131 and exhaust pipe 20 in a plane, a connection portion 143 that connects one end of arcuate portion 141 and one end of arcuate portion 142 together, and a connection portion 144 that connects the other end of arcuate portion 142 and the other end of connection portion 143 together, and connection terminals 146 and 147 provided to arcuate portion 142.

Connection portion 143 and connection portion 144 are formed to pass between center tunnel 12 of floor panel 11 and exhaust pipe 20, similarly as connection portion 133 and connection portion 134 are.

With connection portions 143, 144 passing upwardly of exhaust pipe 20 and arcuate portions 141, 142 aligned with exhaust pipe 20 in a plane, vehicle electromagnetic induction coil 120 less projects from the bottom surface of electrical powered vehicle 100.

Connection portion 133 and connection portion 143 face each other and so do connection portion 134 and connection portion 144, which minimizes/prevents reduced coupling of vehicle self-resonant coil 110 and vehicle electromagnetic induction coil 120 through electromagnetic induction.

Vehicle electromagnetic induction coil 120 that is disposed radially outer than vehicle self-resonant coil 110 is easily connectable to rectifier 130 shown in FIG. 1.

In FIG. 9, vehicle self-resonant coil 110 is spaced from floor panel 11 to minimize/prevent discharging between vehicle self-resonant coil 110 and floor panel 11. Similarly, vehicle electromagnetic induction coil 120 is also spaced from floor panel 11 to minimize/prevent discharging between vehicle electromagnetic induction coil 120 and floor panel 11.

Connection portion 134 (133) has a distance L1 to exhaust pipe 20 and a distance L2 to center tunnel 12 in the vertical direction, where distance L1 is larger than distance L2.

This ensures a distance to insulate exhaust pipe 20 and vehicle self-resonant coil 110 from each other and thus minimize/prevent discharging between exhaust pipe 20 and vehicle self-resonant coil 110 if exhaust pipe 20 and vehicle self-resonant coil 110 vibrate.

Similarly, connection portion 144 has a distance to exhaust pipe 20 and a distance to center tunnel 12 in the vertical direction, where the former distance is larger than the latter distance, to provide a distance ensuring that exhaust pipe 20 and connection portion 144 are insulated from each other.

Exhaust pipe 20 is secured by support 21 and secured by support member 104 and rod 105 securing vehicle self-resonant coil 110 and vehicle electromagnetic induction coil 120. If the engine's vibration causes exhaust pipe 20 to vibrate, with exhaust pipe 20 secured by a member and vehicle self-resonant and electromagnetic induction coils 110 and 120 secured by a separate member, the vibration of exhaust pipe 20 is less transmitted to vehicle self-resonant coil 110 and vehicle electromagnetic induction coil 120.

This minimizes/prevents significant vibration of vehicle self-resonant coil 110 and vehicle electromagnetic induction coil 120 to ensure a distance to insulate vehicle self-resonant and electromagnetic induction coils 110 and 120 and floor panel 11 from each other.

Similarly, it also minimizes/prevents significant vibration of vehicle self-resonant coil 110 and vehicle electromagnetic induction coil 120 to ensure a distance to insulate vehicle self-resonant and electromagnetic induction coils 110 and 120 and exhaust pipe 20 from each other.

Figure 12:
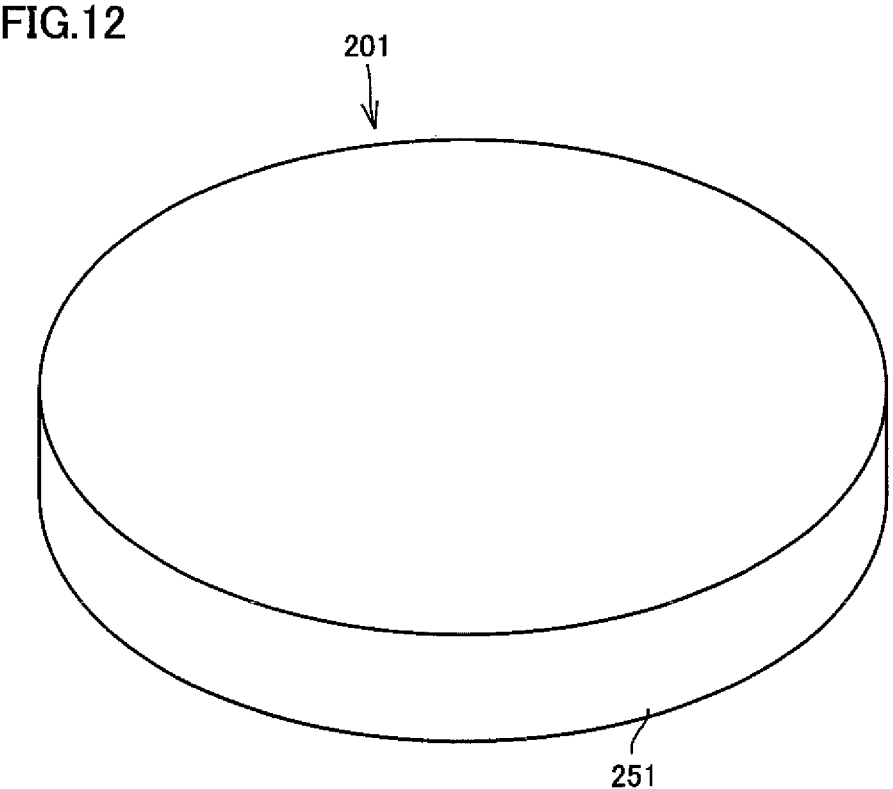
FIG. 12 is a perspective view of facility coil unit 201.

FIG. 12 is a perspective view of facility coil unit 201. In FIG. 12 and FIG. 9, facility coil unit 201 includes a resin casing 251, a shield material 252 provided on resin casing 251 at an inner circumferential surface and a bottom surface, facility electromagnetic induction coil 230 and facility self-resonant coil 240 accommodated in resin casing 251, a support member 253 that holds facility electromagnetic induction coil 230 and facility self-resonant coil 240 together, a rod 254 that secures support member 253 to resin casing 251 at the bottom surface, and facility capacitor 250 connected to rod 254.

When vehicle coil unit 101 and facility coil unit 201 pass electric power therebetween, an intense magnetic field is developed around facility capacitor 250.

In FIG. 9, facility capacitor 250 is provided to be positioned under electrical powered vehicle 100 between side member 10A and side member 10B when electrical powered vehicle 100 is parked in parking space 202 at a prescribed position Accordingly, side members 10A and 10B minimize/prevent an intense magnetic field that is developed around facility capacitor 250 leaking around electrical powered vehicle 100. Facility capacitor 250 is disposed under vehicle capacitor 111.

Figure 13:
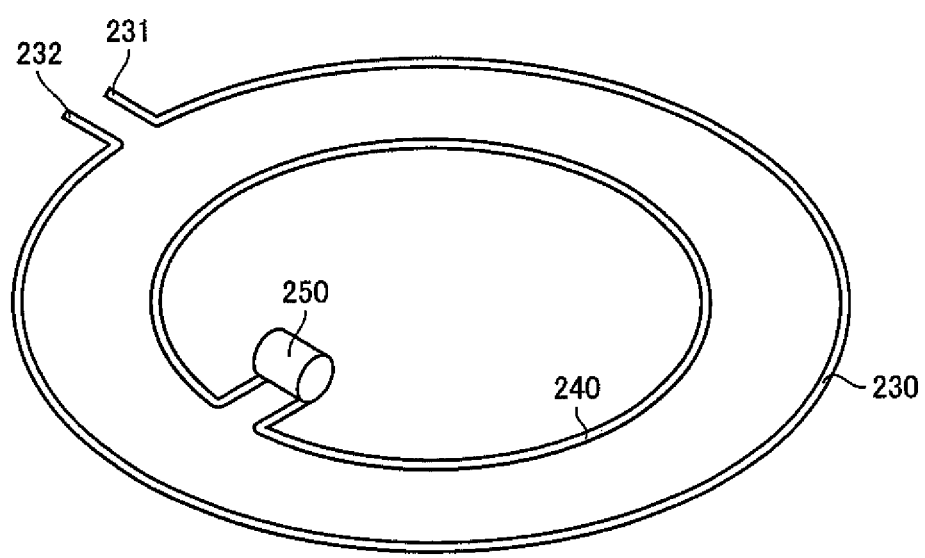
FIG. 13 is a perspective view of a facility electromagnetic induction coil 230, a facility self-resonant coil 240, and a facility capacitor 250.

FIG. 13 is a perspective view of facility electromagnetic induction coil 230, facility self-resonant coil 240, and facility capacitor 250. As shown in FIG. 13, facility self-resonant coil 240 and facility electromagnetic induction coil 230 are each a planar coil, and facility electromagnetic induction coil 230 and facility self-resonant coil 240 are aligned with each other in a plane. This allows facility coil unit 201 to be reduced in thickness.

Facility electromagnetic induction coil 230 is disposed radially outer than facility self-resonant coil 240, which facilitates wiring terminals 231, 232 provided to facility electromagnetic induction coil 230.

Herein, when vehicle self-resonant coil 110 and facility self-resonant coil 240 are seen from above, their respective diameters substantially match.

On the other hand, vehicle self-resonant coil 110 is provided with connection portions 133, 134 and accordingly, has a longer coil wire than facility self-resonant coil 240. On the other hand, facility capacitor 250 is larger in capacitance than vehicle capacitor 111, and an LC resonator formed of facility capacitor 250 and facility capacitor 250 and an LC resonator formed of vehicle self-resonant coil 110 and vehicle capacitor 111 have their respective resonant frequencies substantially matched to each other.

Second Embodiment

Figure 14:
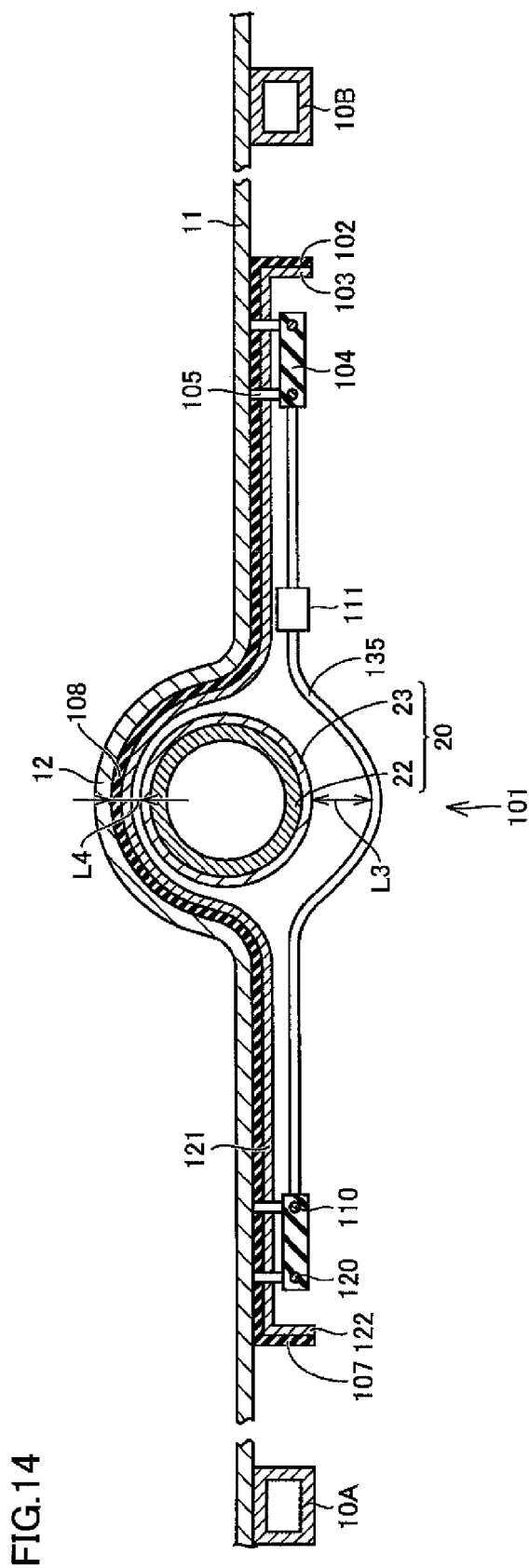
FIG. 14 is a cross section of vehicle coil unit 101 mounted in an electrical powered vehicle according to a second embodiment.
Figure 15:
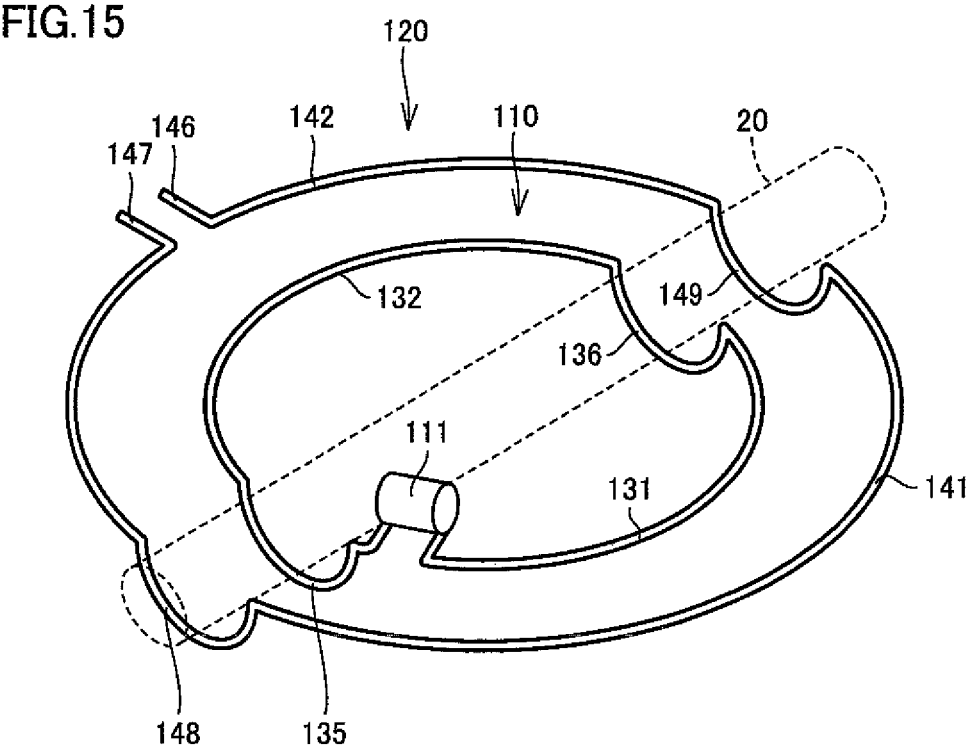
FIG. 15 is a perspective view of vehicle self-resonant coil 110 and vehicle electromagnetic induction coil 120 provided in vehicle coil unit 101 shown in FIG. 14.

FIG. 14 is a cross section of vehicle coil unit 101 mounted in an electrical powered vehicle according to a second embodiment, and FIG. 15 is a perspective view of vehicle self-resonant coil 110 and vehicle electromagnetic induction coil 120 provided in vehicle coil unit 101 shown in FIG. 14.

Note that a configuration/configurations shown in FIG. 14 and FIG. 15 that is/are identical or corresponds/correspond to that/those shown in FIGS. 1-13 may identically be denoted and not be described. The second embodiment also provides vehicle capacitor 111 between side members 10A and 10B, as has been described in the first embodiment.

As shown in FIG. 15, vehicle self-resonant coil 110 includes an arcuate portion 131 aligned with exhaust pipe 20 in a horizontal direction, an arcuate portion 132 opposite to arcuate portion 131 with exhaust pipe 20 posed therebetween, a connection portion 135 that connects one end of arcuate portion 131 and one end of arcuate portion 132 together, and a connection portion 136 that connects the other end of arcuate portion 131 and the other end of arcuate portion 132 together. Connection portion 135 and connection portion 136 pass under exhaust pipe 20 and connect arcuate portion 131 and arcuate portion 132 together.

Vehicle electromagnetic induction coil 120 includes an arcuate portion 141 aligned with exhaust pipe 20 in a horizontal direction, an arcuate portion 142 opposite to arcuate portion 141 with exhaust pipe 20 posed therebetween, a connection portion 148 that connects one end of arcuate portion 141 and one end of arcuate portion 142 together, and a connection portion 149 that connects the other end of arcuate portion 141 and the other end of arcuate portion 142 together. Connection portion 148 and connection portion 149 pass under exhaust pipe 20 and connect arcuate portion 141 and arcuate portion 142 together.

Connection portion 148 and connection portion 135 face each other and so do connection portion 136 and connection portion 149, which prevents vehicle self-resonant coil 110 and vehicle electromagnetic induction coil 120 from receiving electric power from each other inefficiently.

In FIG. 14, a distance L3 between exhaust pipe 20 and connection portion 135 in the vertical direction is larger than a distance L4 between center tunnel 12 and exhaust pipe 20 in the vertical direction.

This ensures a distance to insulate connection portion 135 and exhaust pipe 20 from each other if exhaust pipe 20 and vehicle self-resonant coil 110 vibrate.

Figure 16:
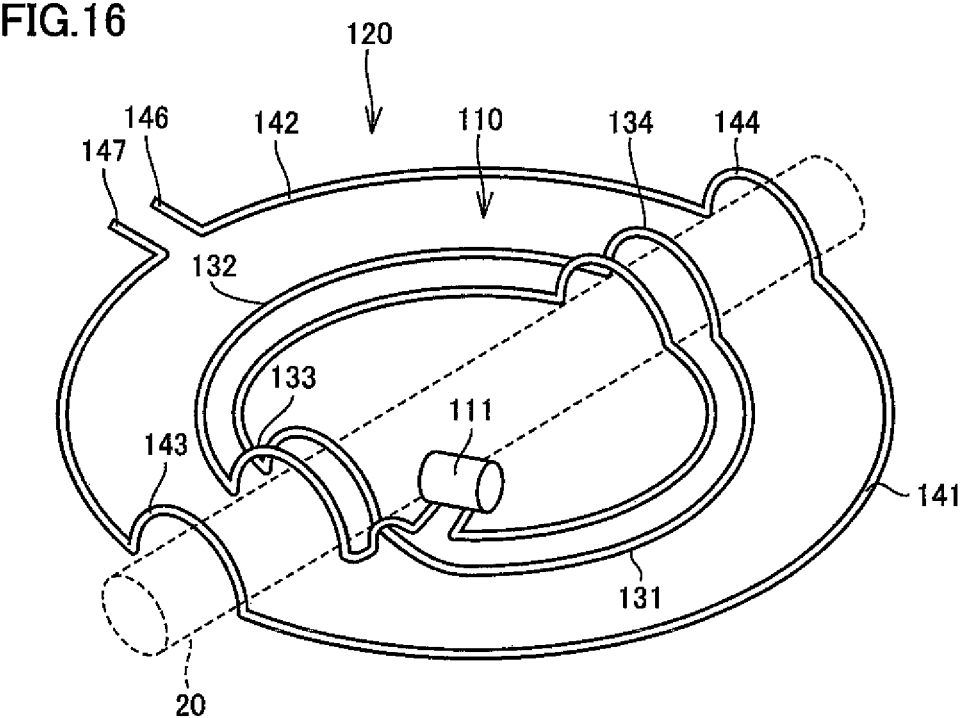
FIG. 16 is a perspective view showing an exemplary variation of vehicle self-resonant coil 110.

Note that while the first and second embodiments provide vehicle self-resonant coil 110 in the form of a planar coil turned once or less, it is not limited thereto. For example, as long as a distance is ensured for insulation, it may be turned twice or more, as shown in FIG. 16. Furthermore while the first and second embodiments also provide vehicle electromagnetic induction coil 120 in the form of a planar coil turned once or less, it is not limited thereto and may be turned twice or more.

While the present invention has been described in embodiments, as above, it should be understood that the embodiments disclosed herein are illustrative and non-restrictive in any respect. The scope of the present invention is defined by the terms of the claims, and is intended to include any modifications within the scope and meaning equivalent to the terms of the claims.

INDUSTRIAL APPLICABILITY

The present invention is applicable to vehicles and external power feeding apparatuses.

REFERENCE SIGNS LIST 10A, 10B: side member; 11: floor panel; 12: center tunnel; 20: exhaust pipe; 21: support; 22: body of pipe; 23, 103, 252: shield material; 100: electrical powered vehicle; 101: vehicle coil unit; 102, 251: resin casing; 104, 253: support member; 105, 254: rod; 106: upper wall portion; 107, 122: peripheral wall portion; 108, 123: raised portion; 109: groove; 110: vehicle self-resonant coil; 111: vehicle capacitor; 120: vehicle electromagnetic induction coil; 121: upper wall portion; 130: rectifier; 200: external power feeding apparatus; 201: facility coil unit; 202: parking space; 210: alternating current power source; 220: high-frequency power driver; 230: facility electromagnetic induction coil; 231, 232: terminal; 240: facility self-resonant coil; 250: facility capacitor.

The invention claimed is:

1. A vehicle equipped with a coil unit capable of receiving electric power from a facility self-resonant coil external to the vehicle, comprising:
a pair of side members aligned in a widthwise direction of the vehicle and extending in a fore-aft direction of the vehicle;
a vehicle self-resonant coil coupled with said facility self-resonant coil resonantly via an electromagnetic field to be capable of receiving electric power from said facility self-resonant coil;
a vehicle capacitor provided to said vehicle self-resonant coil between said pair of side members;
a floor panel provided on said side members; and
a center tunnel that is formed at said floor panel to extend in the fore-aft direction of the vehicle through a widthwise center of the vehicle and is also formed to be raised upwards, wherein
said vehicle capacitor is disposed under said floor panel in said center tunnel.

2. The vehicle according to claim 1, wherein:
said vehicle capacitor is provided between a lateral side of the vehicle and a virtual line extending in the fore-aft direction of the vehicle through a widthwise center of the vehicle; and
said vehicle capacitor is disposed at a position closer to said virtual line than said lateral side of the vehicle.

3. The vehicle according to claim 1, further comprising:
a shield material provided at an internal surface of said center tunnel and a lower surface of said floor panel.

4. The vehicle according to claim 1, wherein:
said vehicle self-resonant coil is disposed under said floor panel; and
said vehicle self-resonant coil is spaced from said floor panel.

5. The vehicle according to claim 4, further comprising:
an exhaust pipe extending in the fore-aft direction of the vehicle and having at least a portion entering said center tunnel, wherein:
said vehicle self-resonant coil includes
a first arcuate portion aligned with said exhaust pipe in a horizontal direction,
a second arcuate portion aligned with said exhaust pipe in the horizontal direction opposite to said first arcuate portion with said exhaust pipe posed therebetween, and
a connection portion passing upwardly of said exhaust pipe and connecting said first arcuate portion and said second arcuate portion together; and
a distance between said connection portion and said exhaust pipe in a vertical direction is larger than a distance between said connection portion and said center tunnel in the vertical direction.

6. The vehicle according to claim 4, further comprising:
an exhaust pipe extending in the fore-aft direction of the vehicle and having at least a portion entering said center tunnel, wherein:
said vehicle self-resonant coil includes
a first arcuate portion aligned with said exhaust pipe in a horizontal direction,
a second arcuate portion aligned with said exhaust pipe in the horizontal direction opposite to said first arcuate portion with said exhaust pipe posed therebetween, and
a connection portion passing downwardly of said exhaust pipe and connecting said first arcuate portion and said second arcuate portion together; and
a distance between said connection portion and said exhaust pipe in a vertical direction is larger than a distance between said exhaust pipe and said center tunnel in the vertical direction.

7. The vehicle according to claim 1, further comprising:
a battery; and
an electromagnetic induction coil electrically connected to said battery and capable of receiving electric power from said vehicle self-resonant coil through electromagnetic induction, wherein
said electromagnetic induction coil and said vehicle self-resonant coil are aligned in a horizontal direction.

8. The vehicle according to claim 7, further comprising:
an exhaust pipe disposed downwardly of said floor panel and extending in the fore-aft direction of the vehicle, wherein:
said vehicle self-resonant coil includes
a first arcuate portion aligned with said exhaust pipe in the horizontal direction,
a second arcuate portion aligned with said exhaust pipe in the horizontal direction opposite to said first arcuate portion with said exhaust pipe posed therebetween, and
a first connection portion passing upwardly of said exhaust pipe and connecting said first arcuate portion and said second arcuate portion together; and
said electromagnetic induction coil includes
a third arcuate portion aligned with said exhaust pipe in the horizontal direction,
a fourth arcuate portion aligned with said exhaust pipe in the horizontal direction opposite to said third arcuate portion with said exhaust pipe posed therebetween, and
a second connection portion passing upwardly of said exhaust pipe and connecting said third arcuate portion and said fourth arcuate portion together.

9. The vehicle according to claim 7, further comprising:
an exhaust pipe disposed downwardly of said floor panel and extending in the fore-aft direction of the vehicle, wherein:
said vehicle self-resonant coil includes
a first arcuate portion aligned with said exhaust pipe in the horizontal direction,
a second arcuate portion aligned with said exhaust pipe in the horizontal direction opposite to said first arcuate portion with said exhaust pipe posed therebetween, and
a first connection portion passing downwardly of said exhaust pipe and connecting said first arcuate portion and said second arcuate portion together; and
said electromagnetic induction coil includes
a third arcuate portion aligned with said exhaust pipe in the horizontal direction,
a fourth arcuate portion aligned with said exhaust pipe in the horizontal direction opposite to said third arcuate portion with said exhaust pipe posed therebetween, and
a second connection portion passing downwardly of said exhaust pipe and connecting said third arcuate portion and said fourth arcuate portion together.

10. The vehicle according to claim 1, further comprising:
an exhaust pipe disposed downwardly of said floor panel and extending in the fore-aft direction of the vehicle;
a first securing member that secures said vehicle capacitor to said floor panel; and
a second securing member that is provided separately from said first securing member and secures said exhaust pipe to said floor panel.

11. The vehicle according to claim 1, further comprising:
an exhaust pipe disposed downwardly of said floor panel and extending in the fore-aft direction of the vehicle, wherein
said exhaust pipe includes a pipe body and a pipe shield material covering a portion of said pipe body located under said coil unit.

12. The vehicle according to claim 1, further comprising:
a shield material provided between said vehicle self-resonant coil and said floor panel.

13. A vehicle equipped with a coil unit capable of receiving electric power from a facility self-resonant coil external to the vehicle, comprising:
a pair of side members aligned in a widthwise direction of the vehicle and extending in a fore-aft direction of the vehicle;
a vehicle self-resonant coil coupled with said facility self-resonant coil resonantly via an electromagnetic field to be capable of receiving electric power from said facility self-resonant coil;
a vehicle capacitor provided to said vehicle self-resonant coil between said pair of side members;
a floor panel provided on said side members;
a center tunnel that is formed at said floor panel to be located at a widthwise center of the vehicle and extend in the fore-aft direction of the vehicle, and also be raised upwards; and
an exhaust pipe extending in the fore-aft direction of the vehicle and having at least a portion entering said center tunnel; wherein:
said vehicle self-resonant coil is disposed under said floor panel;
said vehicle self-resonant coil is spaced from said floor panel;
said vehicle self-resonant coil includes
a first arcuate portion aligned with said exhaust pipe in a horizontal direction,
a second arcuate portion aligned with said exhaust pipe in the horizontal direction opposite to said first arcuate portion with said exhaust pipe posed therebetween, and
a connection portion passing upwardly of said exhaust pipe and connecting said first arcuate portion and said second arcuate portion together; and
a distance between said connection portion and said exhaust pipe in a vertical direction is larger than a distance between said connection portion and said center tunnel in the vertical direction.

14. A vehicle equipped with a coil unit capable of receiving electric power from a facility self-resonant coil external to the vehicle, comprising:
a pair of side members aligned in a widthwise direction of the vehicle and extending in a fore-aft direction of the vehicle;
a vehicle self-resonant coil coupled with said facility self-resonant coil resonantly via an electromagnetic field to be capable of receiving electric power from said facility self-resonant coil;
a vehicle capacitor provided to said vehicle self-resonant coil between said pair of side members;
a floor panel provided on said side members;
a center tunnel that is formed at said floor panel to be located at a widthwise center of the vehicle and extend in the fore-aft direction of the vehicle, and also be raised upwards; and
an exhaust pipe extending in the fore-aft direction of the vehicle and having at least a portion entering said center tunnel; wherein:
said vehicle self-resonant coil is disposed under said floor panel;
said vehicle self-resonant coil is spaced from said floor panel;
said vehicle self-resonant coil includes
a first arcuate portion aligned with said exhaust pipe in a horizontal direction,
a second arcuate portion aligned with said exhaust pipe in the horizontal direction opposite to said first arcuate portion with said exhaust pipe posed therebetween, and
a connection portion passing downwardly of said exhaust pipe and connecting said first arcuate portion and said second arcuate portion together; and
a distance between said connection portion and said exhaust pipe in a vertical direction is larger than a distance between said exhaust pipe and said center tunnel in the vertical direction.

15. A vehicle equipped with a coil unit capable of receiving electric power from a facility self-resonant coil external to the vehicle, comprising:
a pair of side members aligned in a widthwise direction of the vehicle and extending in a fore-aft direction of the vehicle;
a vehicle self-resonant coil coupled with said facility self-resonant coil resonantly via an electromagnetic field to be capable of receiving electric power from said facility self-resonant coil;
a vehicle capacitor provided to said vehicle self-resonant coil between said pair of side members;
a battery;

an electromagnetic induction coil electrically connected to said battery and capable of receiving electric power from said vehicle self-resonant coil (110) through electromagnetic induction a floor panel provided on said side members; and an exhaust pipe disposed downwardly of said floor panel and extending in the fore-aft direction of the vehicle, wherein said electromagnetic induction coil and said vehicle self-resonant coil are aligned in a horizontal direction, said vehicle self-resonant coil includes
- a first arcuate portion aligned with said exhaust pipe in the horizontal direction,
- a second arcuate portion aligned with said exhaust pipe in the horizontal direction opposite to said first arcuate portion with said exhaust pipe posed therebetween, and
- a first connection portion passing upwardly of said exhaust pipe and connecting said first arcuate portion and said second arcuate portion together; and said electromagnetic induction coil includes
- a third arcuate portion aligned with said exhaust pipe in the horizontal direction,
- a fourth arcuate portion aligned with said exhaust pipe in the horizontal direction opposite to said third arcuate portion with said exhaust pipe posed therebetween, and
- a second connection portion passing upwardly of said exhaust pipe and connecting said third arcuate portion and said fourth arcuate portion together.

16. A vehicle equipped with a coil unit capable of receiving electric power from a facility self-resonant coil external to the vehicle, comprising:

a pair of side members aligned in a widthwise direction of the vehicle and extending in a fore-aft direction of the vehicle;

a vehicle self-resonant coil coupled with said facility self-resonant coil resonantly via an electromagnetic field to be capable of receiving electric power from said facility self-resonant coil;

a vehicle capacitor provided to said vehicle self-resonant coil between said pair of side members;

a battery;

an electromagnetic induction coil electrically connected to said battery and capable of receiving electric power from said vehicle self-resonant coil (110) through electromagnetic induction a floor panel provided on said side members; and an exhaust pipe disposed downwardly of said floor panel and extending in the fore-aft direction of the vehicle, wherein said electromagnetic induction coil and said vehicle self-resonant coil are aligned in a horizontal direction, said vehicle self-resonant coil includes
- a first arcuate portion aligned with said exhaust pipe in the horizontal direction,
- a second arcuate portion aligned with said exhaust pipe in the horizontal direction opposite to said first arcuate portion with said exhaust pipe posed therebetween, and
- a first connection portion passing downwardly of said exhaust pipe and connecting said first arcuate portion and said second arcuate portion together; and said electromagnetic induction coil includes
- a third arcuate portion aligned with said exhaust pipe in the horizontal direction,
- a fourth arcuate portion aligned with said exhaust pipe in the horizontal direction opposite to said third arcuate portion with said exhaust pipe posed therebetween, and
- a second connection portion passing downwardly of said exhaust pipe and connecting said third arcuate portion and said fourth arcuate portion together.

* * * * *